(12) United States Patent
Dong et al.

(10) Patent No.: US 7,496,096 B1
(45) Date of Patent: Feb. 24, 2009

(54) METHOD AND SYSTEM FOR DEFINING HARDWARE ROUTING PATHS FOR NETWORKS HAVING IP AND MPLS PATHS

(75) Inventors: Liqin Dong, Sunnyvale, CA (US); Milton Y. Xu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 863 days.

(21) Appl. No.: 10/066,069

(22) Filed: Jan. 31, 2002

(51) Int. Cl.
H04L 12/28 (2006.01)
(52) U.S. Cl. .................................. 370/392; 370/411
(58) Field of Classification Search ................ 370/389, 370/392, 393, 411, 419
See application file for complete search history.

(56) References Cited

U.S. PATENT DOCUMENTS

| | | | |
|---|---|---|---|
| 6,069,889 A * | 5/2000 | Feldman et al. | 370/351 |
| 6,151,324 A * | 11/2000 | Belser et al. | 370/397 |
| 6,205,488 B1 | 3/2001 | Casey et al. | 709/238 |
| 6,374,303 B1 | 4/2002 | Armitage et al. | 709/242 |
| 6,553,030 B2 * | 4/2003 | Ku et al. | 370/390 |
| 6,625,161 B1 * | 9/2003 | Su et al. | 370/415 |
| 6,683,874 B1 * | 1/2004 | Nagami et al. | 370/392 |
| 6,697,361 B2 * | 2/2004 | Fredette et al. | 370/389 |
| 6,721,269 B2 * | 4/2004 | Cao et al. | 370/227 |
| 6,728,268 B1 * | 4/2004 | Bird | 370/474 |
| 6,731,639 B1 * | 5/2004 | Ors et al. | 370/395.51 |
| 6,795,433 B1 * | 9/2004 | Li | 370/389 |
| 6,795,863 B1 * | 9/2004 | Doty, Jr. | 709/231 |
| 2002/0004843 A1 * | 1/2002 | Andersson et al. | 709/238 |
| 2002/0103924 A1 * | 8/2002 | Nomura | 709/235 |
| 2002/0129086 A1 * | 9/2002 | Garcia-Luna-Aceves et al. | 709/200 |
| 2003/0037042 A1 * | 2/2003 | Kametani | 707/3 |
| 2003/0112764 A1 * | 6/2003 | Gaspard et al. | 370/252 |

OTHER PUBLICATIONS

"Framework for IP Multicast in MPLS", Internet Draft, D. Ooms, et al., Network Working Group, Apr. 2002.

* cited by examiner

Primary Examiner—Firmin Backer
Assistant Examiner—Christine Ng
(74) Attorney, Agent, or Firm—Cindy Kaplan (57) ABSTRACT

A method for defining hardware routing paths for networks having IP and MPLS paths generally comprises assigning a path ID for each path within a path group. The path ID for each path is an IP address and the path group contains all IP paths, all MPLS paths, or both IP and MPLS paths. The path ID for each MPLS path is a unique IP multicast address. The method further includes comparing all path IDs in each path group and assigning a common hardware resource to groups having matching path IDs.

19 Claims, 6 Drawing Sheets

TABLE Ia

| Prefix A (10.0.0.0) |
| --- |
| PATH 1 |
| PATH 2 |
| PATH 3 |

TABLE IIa

| Prefix B (11.0.0.0) |
| --- |
| PATH 1 |
| PATH 2 |
| PATH 3 |

TABLE IIIa

| Prefix C (12.0.0.0) |
| --- |
| PATH 1 |
| PATH 2 |
| PATH 4 |

FIG. 3

TABLE Ib

| Prefix A (10.0.0.0) | |
|---|---|
| PATH | PATH ID |
| PATH 1 | 151.1.1.1 |
| PATH 2 | 152.1.1.1 |
| PATH 3 | 224.0.0.1 |

TABLE IIb

| Prefix B (11.0.0.0) | |
|---|---|
| PATH | PATH ID |
| PATH 1 | 151.1.1.1 |
| PATH 2 | 152.1.1.1 |
| PATH 3 | 224.0.0.1 |

TABLE IIIb

| Prefix C (12.0.0.0) | |
|---|---|
| PATH | PATH ID |
| PATH 1 | 151.1.1.1 |
| PATH 2 | 152.1.1.1 |
| PATH 4 | 224.0.0.2 |

METHOD AND SYSTEM FOR DEFINING HARDWARE ROUTING PATHS FOR NETWORKS HAVING IP AND MPLS PATHS

BACKGROUND OF THE INVENTION

The present invention relates generally to communication networks, and more specifically, to a method and system for uniformly handling IP (Internet Protocol) and MPLS (Multi-Protocol Label Switching) path calculations to maximize hardware path resource utilization.

The rapid growth of the Internet and the widespread deployment of networks built around the Internet Protocol suite are creating a demand for new capabilities in IP networks. MPLS provides a number of powerful capabilities such as traffic engineering, etc. As with IP routers, MPLS nodes use a routing protocol such as OSPF or IS-IS to calculate network paths and establish reachability. Multiprotocol Label Switching is an IETF initiative that integrates Layer 2 information about network links (bandwidth, latency, utilization) into Layer 3 (TP) in order to simplify and improve IP packet exchange. MPLS provides network operators a great deal of flexibility to divert and route traffic around link failures, congestion, and bottlenecks. MPLS based networks are becoming increasingly important for today's backbone Internet.

In MPLS, data transmission occurs on label-switched paths (LSPs). LSPs are a sequence of labels at each and every node along the path from the source to the destination. LSPs are established prior to data transmission (control-driven). The labels, which are underlying protocol-specific identifiers, are distributed using label distribution protocol (LDP) or RSVP or piggybacked on routing protocols like multiprotocol border gateway protocol (MPBGP). Each data packet encapsulates and carries the labels during their journey from source to destination. High-speed switching of data is possible because the fixed-length labels are inserted at the very beginning of the packet or cell and can be used by hardware to switch packets quickly between links.

When packets enter an MPLS-based network, Label Edge Routers (LERs) give them a label (identifier). These labels can contain information based on the routing table entry (i.e., destination, bandwidth, delay, and other metrics). Once this classification is complete and mapped, different packets are assigned to corresponding Labeled Switch Paths (LSPs), where Label Switch Routers (LSRs) place outgoing labels on the packets. With these LSPs, network operators can divert and route traffic based on data-stream type and Internet-access customer.

With MPLS, incoming packets (predominantly IP packets) are assigned with a label when the packets enter the MPLS network. Packet forwarding is done based on label information within the MPLS core network. In order to maximize network performance and get path protection, it is a common practice to create multiple paths within a network that the packets can take to reach their final destinations. This is referred to as traffic load sharing among multiple paths. When an MPLS enabled network is part of a bigger network, it is possible that incoming IP packets can take both MPLS and IP paths to their destinations, depending on particular traffic flow information contained in the packets.

In today's routers, packets are typically forwarded with the assistance of ASIC hardware. After an IP packet enters a router, the router decides the next hop or path the packet needs to go by looking up the routing table, typically using the destination address of the IP packet. When load sharing paths are available, multiple hardware paths need to be set up for a given route. The conventional approach to deal with a group of mixed IP and MPLS paths is to deal with them separately. Since IP paths are based on the next hop IP address and MPLS paths are based on the MPLS encapsulation string, this appears to be the natural thing to do as each path has its unique characteristics (IP address and label stack). If the paths contain both IP and MPLS path, the hardware paths must contain different information in order to forward the packets onto MPLS or IP paths. Thus, with this approach, each route requires independent hardware path resources to support IP and MPLS mixed load sharing paths.

Due to ASIC resource limitations, it is often required that paths that belong to the same load sharing group must be allocated in contiguous blocks. Each MPLS path uses a different label stack, so each MPLS path requires a separate hardware path. However, there are only a finite number of hardware path resources available on a router system.

There is, therefore, a need for a method and system that treats IP and MPLS paths in a uniform way when organizing, sorting, and comparing IP and MPLS paths in order to achieve maximum hardware path resource utilization.

SUMMARY OF THE INVENTION

A system and method for assigning hardware routing paths in a network having IP paths and MPLS paths are disclosed.

A method of the present invention generally comprises assigning a path ID for each path within a path group. The path ID for each path is an IP address and the path group contains IP paths, MPLS paths, or both IP and MPLS paths. The method further includes comparing all path IDs in each path group and assigning a common hardware resource to groups having matching path IDs.

A system of the present invention generally comprises a processor operable to assign a path ID for each path within a path group, compare all path IDs in each path group, and assign a common hardware resource to groups having matching path IDs. The system further includes memory for storing the path IDs.

In another aspect of the present invention, a computer program product for defining hardware routing paths in a network having IP paths and MPLS paths generally comprises code that assigns a path ID for each path within a path group; code that compares all path IDs in each path group; and code that assigns a common hardware resource to groups having matching path IDs. The product further includes a computer-readable storage medium for storing the codes.

In a preferred embodiment, the path ID for each IP path is a unicast IP address corresponding to the IP path's next hop IP address and the path ID for each of the MPLS paths is preferably a unique IP multicast address. The multicast addresses are selected from an internal managed group of IDs that is sufficiently large to represent all network hardware paths. A unique IP address is assigned for each software MPLS path entity. An assigned IP multicast address is returned to the group of internal managed IDs when a path entity is deleted.

The method may also include sorting the paths in each path group by the value of the path ID for efficient path comparison. The sorted path groups are stored at least temporarily in a database.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
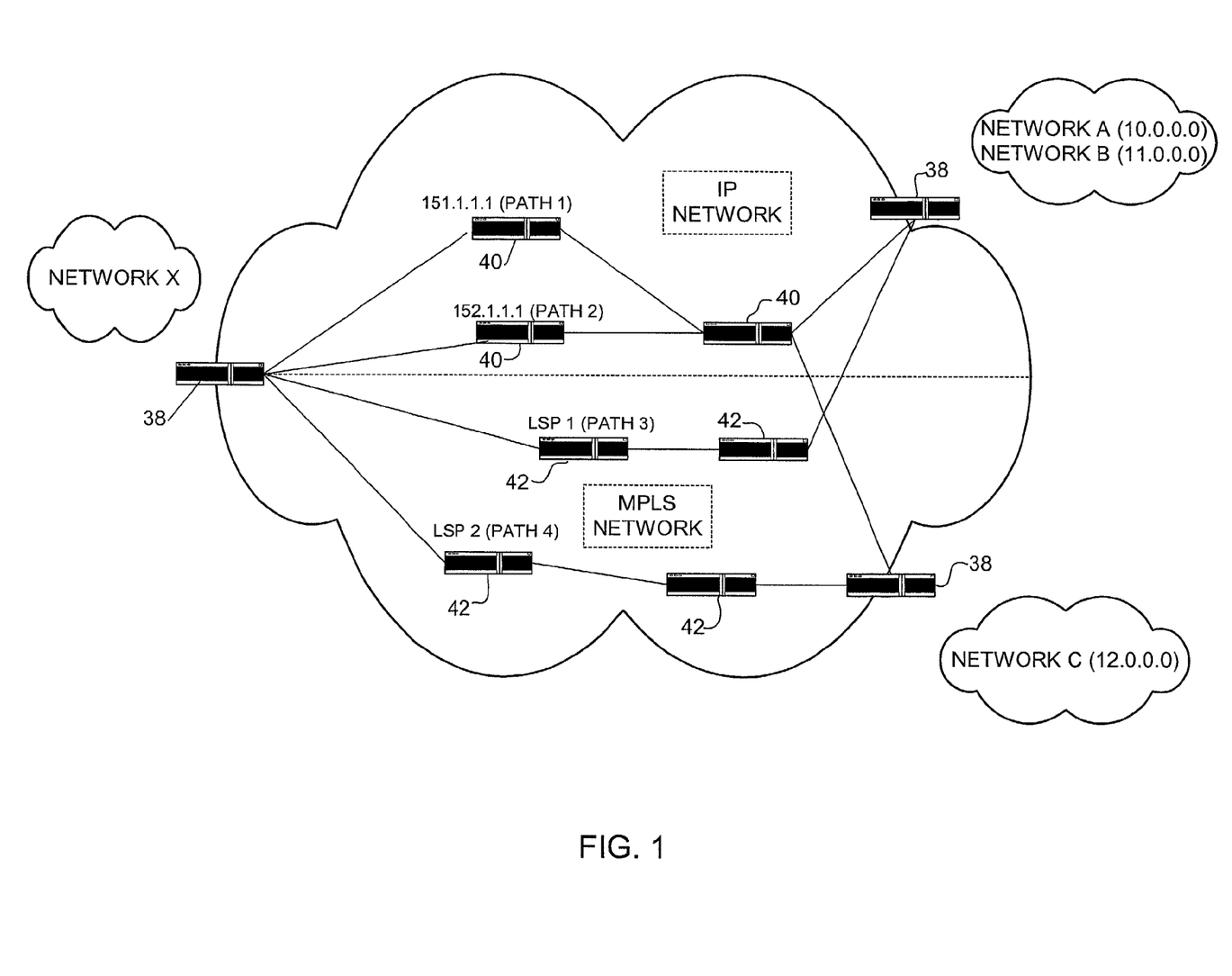
FIG. 1 is a network diagram illustrating routing paths for an IP network and an MPLS network.

Referring now to the drawings, and first to FIG. 1, a network that may use the system and method of the present invention is shown. The network includes an IP network and an MPLS network which provide IP paths and MPLS paths, respectively, between network X and networks A, B, and C. The conventional approach on a router to program the hardware paths that include both MPLS paths and IP paths is to treat the two different types of paths separately, as each has their unique characteristics. An IP path is based on the next hop IP address (a four byte unsigned value) while an MPLS path is based on a path rewrite entity which primarily contains a byte string that consists of the MPLS label stack in addition to destination and source MAC address. As described in detail below, the present invention provides a novel method and system for handling IP and MPLS path calculations in a uniform way to maximize hardware path resource utilization.

The present invention operates in the context of a data communication network including multiple network elements. Some of the elements in a network that employs the present invention may be network devices such as routers and switches. For example, some of the nodes may be specially configured routers such as those available from Cisco Systems, Inc. of San Jose, Calif. As used herein the term router is used to refer to devices that forward packets based on network and higher layer information. The router may include, for example, a master central processing unit (CPU), interfaces, a hardware assisted forwarding engine, and a bus (e.g., a PCI bus). The CPU preferably includes a memory and a processor. When acting under the control of appropriate software or firmware, the CPU is responsible for such router tasks as routing table computations, network management, and general processing of packets. It preferably accomplishes all these functions under the control of software including an operating system (e.g., a version of the Internetwork Operating System (IOS®) of Cisco Systems, Inc.) and any appropriate applications software. The CPU may include one or more processors such as a processor from the Motorola family or microprocessors of the MIPS family of microprocessors. In an alternative embodiment, the processor is specially designed hardware for controlling operations of the router. Memory can be non-volatile RAM and/or ROM. However, there are many different ways in which memory could be coupled to the system. In an alternative embodiment, a router or switch may be implemented on a general purpose network host machine such as the computer system of FIG. 2, described below.

Figure 2:
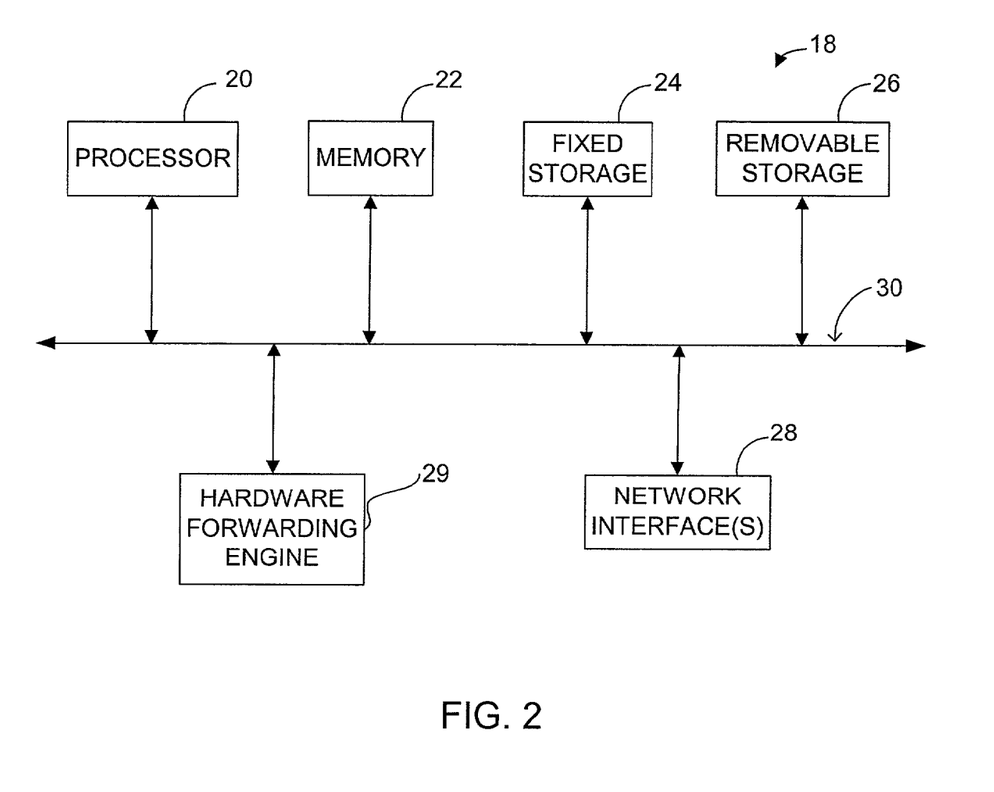
FIG. 2 is a system block diagram of a computer system that can be utilized to execute software of an embodiment of the present invention.

FIG. 2 shows a system block diagram of computer system 18 that may be used to execute software of an embodiment of the invention. The computer system 18 includes memory 22 which can be utilized to store and retrieve software programs incorporating computer code that implements aspects of the invention, data for use with the invention, and the like. Exemplary computer readable storage media include CD-ROM, floppy disk, tape, flash memory, system memory, and hard drive. Additionally, a data signal embodied in a carrier wave (e.g., in a network including the Internet) may be the computer readable storage medium. Computer system 18 further includes subsystems such as a central processor 20, fixed storage 24 (e.g., hard drive), removable storage 26 (e.g., CD-ROM drive), one or more network interfaces 28, and a hardware forwarding engine 29. Other computer systems suitable for use with the invention may include additional or fewer subsystems. For example, computer system 18 may include more than one processor 20 (i.e., a multi-processor system) or a cache memory. The computer system 18 may also include a display, keyboard, and mouse (not shown) for use as a host.

Hardware forwarding engine 29 uses hardware to forward data packets to achieve high performance. The hardware routing table and adjacency table are programmed with the assistance of software prior to data transmission. The present invention provides a uniform way of handling IP and MPLS paths to maximize hardware resources. When data packets arrive, the hardware forwarding engine 29 looks up the hardware routing table, finds the route entry and adjacency to route the packet and forward the packets accordingly.

The system bus architecture of computer system 18 is represented by arrows 30 in FIG. 2. However, these arrows are only illustrative of one possible interconnection scheme serving to link the subsystems. For example, a local bus may be utilized to connect the central processor 20 to the system memory 22. Computer system 18 shown in FIG. 2 is only one example of a computer system suitable for use with the invention. Other computer architectures having different configurations of subsystems may also be utilized. Communication between computers within the network is made possible with the use of communication protocols, which govern how computers exchange information over a network.

Referring again to FIG. 1, the network includes an IP network comprising a plurality of routers 40 and an MPLS network comprising a plurality of routers 42. In MPLS, data transmission occurs on label-switched paths (LSPs). LSPs are a sequence of labels at each and every node along the path from the source to the destination. Fixed-length labels are inserted at the very beginning of the packet or cell and can be used by hardware to switch packets quickly between links. The routers may be, for example, a line edge router (LER) 38 or a label switching router (LSR). The LSRs participate in the establishment of LSPs using the appropriate label signaling protocol and high-speed switching of the data traffic based on the established paths. LERs 38 operate at the edge of the access network and MPLS network and support multiple ports connected to dissimilar networks (such as frame relay, ATM, and Ethernet) and forwards this traffic on to the MPLS network after establishing LSPs, using the label signaling protocol at the ingress and distributing the traffic back to the access networks at the egress. A label identifies the path a packet should traverse and is carried or encapsulated in a Layer-2 header along with the packet. The receiving router examines the packet for its label content to determine the next hop. Once a packet has been labeled, the travel of the packet through the network backbone is based on label switching.

As shown in FIG. 1, when an MPLS enabled network is part of a bigger network a route can often have multiple paths to the destination. These multiple paths can include IP paths (Paths 1 and 2) and MPLS paths (Paths 3 and 4) (FIG. 1). IP Path 1 extends between the LERs 38 coupled to network X and networks A, B, and C. IP Path 2 extends between the LERs 38 coupled to network X and networks A, B, and C. MPLS Path 3 extends between the LERs 38 coupled to network X and networks A and B. MPLS Path 4 extends between the LERs 38 coupled to network X and network C.

An IP path for a given route within a router is typically represented by the router's next hop IP address, which is a four-byte value. For example, Path 1 of FIG. 1 is represented by 151.1.1.1 and Path 2 is represented by 152.1.1.1. An MPLS path for a given route is typically represented by an encapsulated byte string, which contains the destination and source MAC addresses and the variable sized MPLS label stack. The system of the present invention treats each MPLS path the same as the IP path by assigning a path ID that is similar to the path ID used for IP paths. Each IP and MPLS path in a load sharing path group is given a unique path ID. The IP path ID comes from the next hop IP address of the path for the route. Each MPLS path is assigned a special IP multicast address, where the four most significant bits have the format of 1110 (binary) and the rest of the bits come from an internally managed pool of identifiers ranging from 0 to 1111, 11111111, 11111111 (binary). This range is sufficiently large for representing all of the hardware paths within the network. The 1110 prefix differentiates the MPLS paths from IP paths since the next hop IP address used for representing an IP path never uses an IP multicast address. With this ID assignment, the MPLS paths in a load sharing path group are handled the same as the IP paths. The MPLS path IDs may also be broadcast IP addresses of the form 255.x.x.x.

The lower portion of the ID for MPLS path comes from an internal managed pool of ID's for uniqueness while the most significant bits always takes 1110(B). The MPLS path ID is assigned only once for a software MPLS path entity. This path ID is returned to the ID pool when the path entity is deleted.

Figure 3:
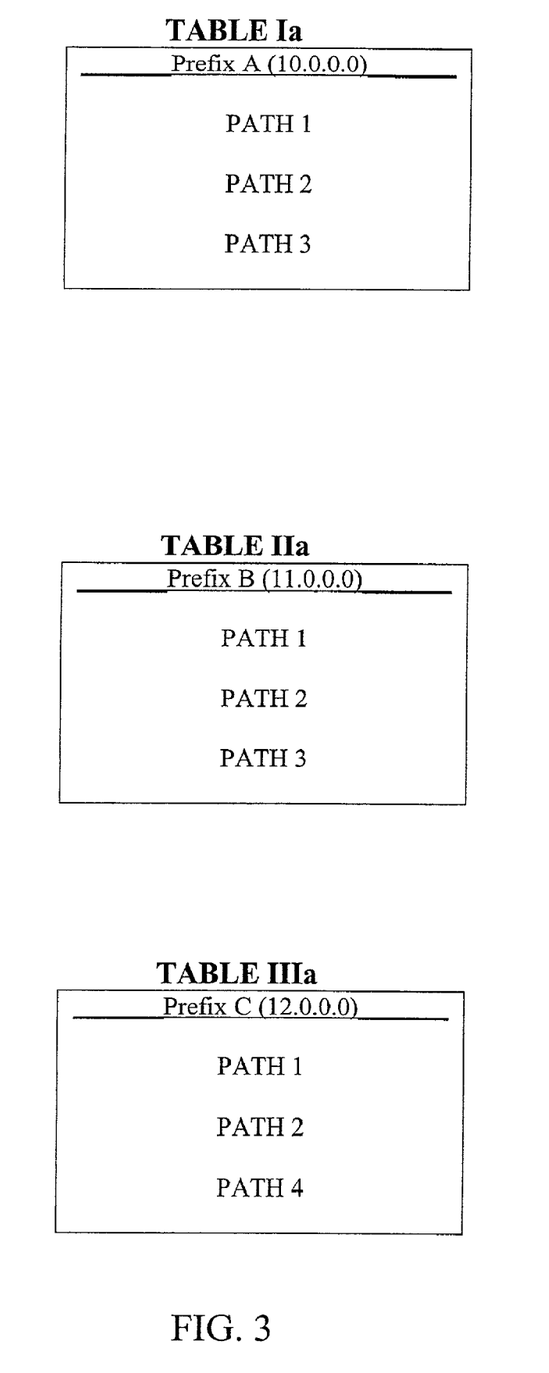
FIG. 3 shows tables listing paths for networks A, B, and C of the diagram of FIG. 1.
Figure 4:
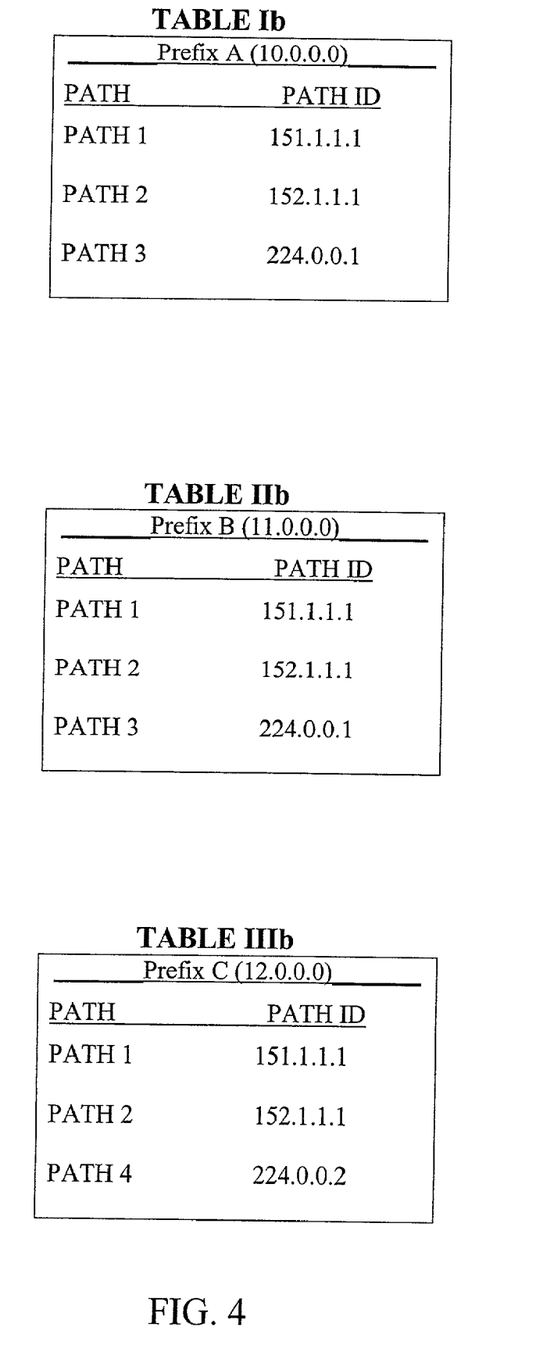
FIG. 4 shows tables listing path IDs for the paths listed in the tables of FIG. 3.

The process of assigning path IDs is illustrated in FIGS. 3 and 4. Tables Ia, IIa, and IIIa shown in FIG. 3 lists paths for prefixes A, B, and C (corresponding to paths from LER 38 (coupled to network X) to networks A, B, and C, respectively). FIG. 4 shows Tables Ib, IIb, and IIIb, which list the path IDs assigned to each path. As previously described, the path ID for each IP path is its next hop IP address (unicast IP address) and a unique IP multicast address is assigned as the path ID for each MPLS path. In this example, path 1 has a path ID of 151.1.1.1, path 2 has a path ID of 152.1.1.1, path 3 is assigned a path ID of 224.0.0.1 and path 4 is assigned a path ID of 224.0.0.2.

Figure 5:
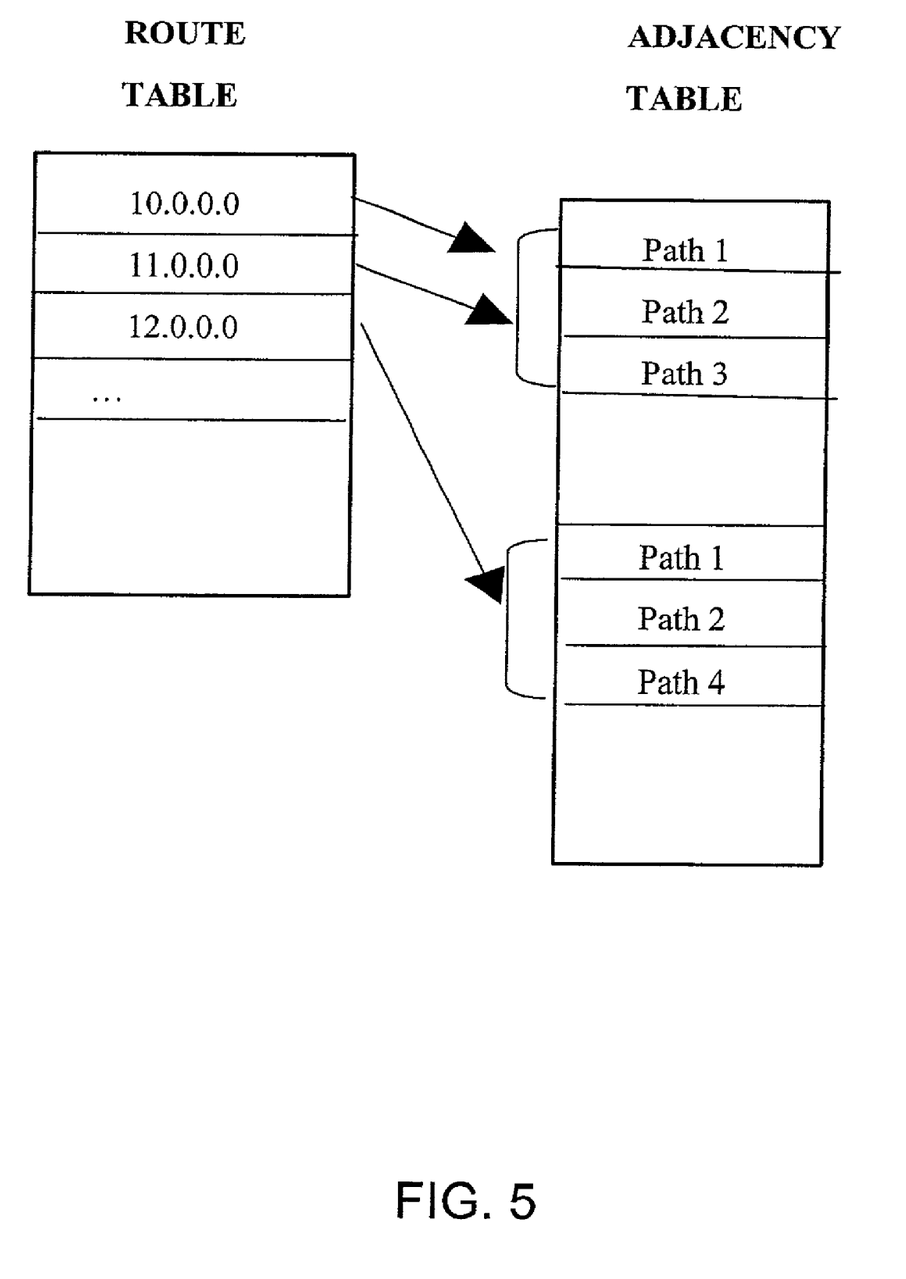
FIG. 5 is a diagram of a route table and adjacency table created by a system of the present invention for the network shown in FIG. 1.

After path IDs are assigned, each path in the path group is sorted by the value of the path ID for efficient path comparison that is used for matching path groups to achieve path sharing. The path IDs may be sorted by any method that simplifies the matching process. The tables of FIG. 4 are all sorted in the same manner. The path IDs in each prefix's path group are then compared to see whether there is any path group that can be shared. Each path group identified by the path ID (or hashed path IDs) as the key is used to build a database that can facilitate the path group matching to determine the hardware path sharing for different routes. In the above example, prefix A and prefix B share the same path group since the individual path IDs match. The resulting route table and adjacency table are shown in FIG. 5. As can be seen by FIG. 5, hardware resources are maximized since the same hardware resource is shared between the matching groups for prefix A and prefix B.

Figure 6:
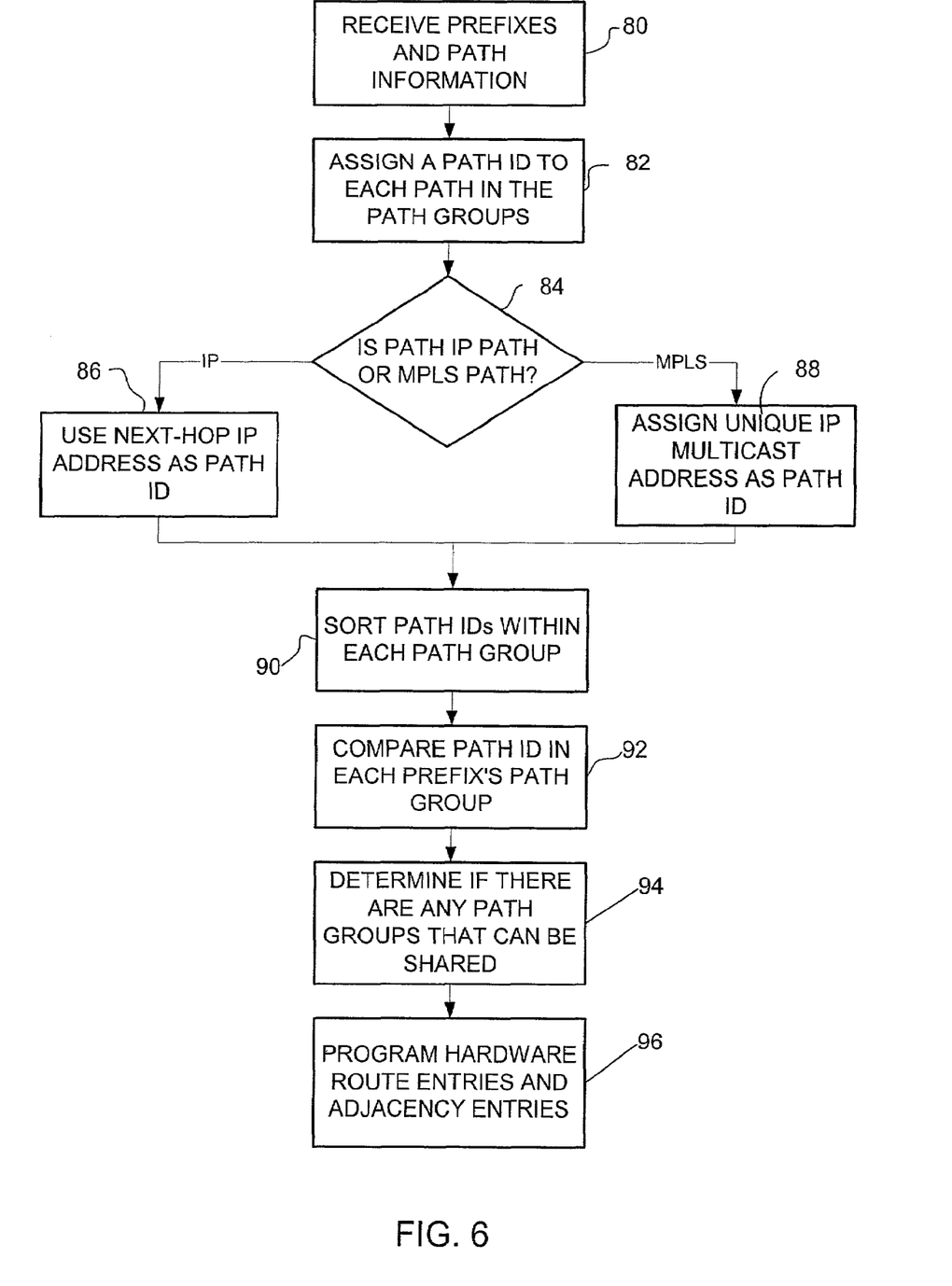
FIG. 6 is a flowchart illustrating a process of the present invention for handling IP and MPLS path calculations.

FIG. 6 is a flowchart illustrating the above-described process of the present invention. At step 80 prefix and path information is received. A path ID is assigned to each path in the path groups at step 82. If the path is an IP path the next-hop IP address is used as the path ID (steps 84 and 86). If the path is an MPLS path, a unique IP multicast address is assigned as the path ID (steps 84 and 88). The path IDs in each prefix's path group are then sorted (step 90) to provide efficient comparison of the path groups in step 92. It is determined whether there are any path groups that can be shared at step 94. Hardware route entries and adjacency entries are programmed to define the hardware resources (step 96). It is to be understood that the process may be different than that shown in FIG. 6 and described above, without departing from the scope of the invention. For example, the sorting step 90 may be skipped.

As can be observed from the foregoing, the present invention has numerous advantages. The system provides hardware resource savings since multiple routes share the same hardware path. Thus, making the system highly scalable and enabling the system to support more routing entries without consuming additional resources to store the path information. The system further provides a uniform way of handling IP and MPLS paths. A shorter path ID is used to represent a longer MPLS encapsulation string so that the comparison for determining path matching can be accomplished quicker. The data forwarding scheme is self contained and independent of any routing protocol implementation details so that routing protocol implementation change is not likely to cause data forwarding scheme changes.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for defining hardware routing paths in a network having IP paths and MPLS paths to a destination node, the method comprising:

receiving path information for a plurality of paths in a path group, the path group comprising both IP and MPLS paths, each of the IP paths represented by an IP address and each of the MPLS paths represented by a label;

assigning a unique path ID for each path within the path group, the path ID for each path comprising an IP address;

comparing all path IDs in each path group; and assigning a common hardware resource to groups having matching path IDs;

wherein the path ID assigned for each of said IP paths comprises a unicast IP address and the path ID assigned for each of said MPLS paths comprises a unique IP multicast address.

2. The method of claim 1 wherein the unicast IP address corresponds to the IP path's next hop IP address.

3. The method of claim 2 wherein the IP multicast address is obtained from a pool of identifiers.

4. The method of claim 1 wherein assigning a unique IP multicast address comprises assigning a unique IP address from an internal managed group of IDs.

5. The method of claim 4 wherein the internal managed group of IDs is sufficiently large to represent all network hardware paths.

6. The method of claim 4 wherein assigning a unique IP address comprises assigning a unique IP address for each software MPLS path entity.

7. The method of claim 6 further comprising returning an assigned unique IP address to the group of internal managed IDs when a path entity is deleted.

8. The method of claim 1 further comprising sorting the paths in each of the path groups.

9. The method of claim 8 wherein sorting the paths comprises sorting the paths by the value of the path ID.

10. The method of claim 1 further comprising building a database containing all path groups and using the database to compare the group paths.

11. The method of claim 1 further comprising programming entries in a route table and adjacency table to define hardware resources.

12. The method of claim 1 wherein said path group comprises paths having corresponding source routers and destination routers.

13. The method of claim 1 wherein said common hardware resource is a hardware path.

14. The method of claim 1 wherein comparing said path IDs comprises comparing path IDs in a prefix's path group.

15. A system for defining hardware routing paths in a network having IP paths and MPLS paths, the system comprising:

a processor operable to receive path information for a plurality of paths in a path group, the path group comprising both IP and MPLS paths, each of the IP paths represented by an IP address and each of the MPLS paths represented by a label, assign a unique path ID for each path within the path group, the path ID for each path comprising an IP address, compare all path IDs in each path group, and assign a common hardware resource to groups having matching path IDs; and memory for storing the path IDs;

wherein the path ID assigned for each of said IP paths comprises a unicast IP address and the path ID assigned for each of said MPLS paths comprises a unique IP multicast address.

16. The system of claim 15 wherein the path IDs assigned for MPLS paths comprise broadcast IP addresses of form 255.x.x.x.

17. The system of claim 15 further comprising a database of multicast IP addresses sufficiently large to represent all network hardware paths.

18. The system of claim 15 wherein the IP multicast addresses assigned to said MPLS paths each comprise a common prefix and wherein said prefix is different than a prefix of the unicast IP addresses and said path IDs.

19. A computer program product for defining hardware routing paths in a network having IP paths and MPLS paths, the product comprising:

code that receives path information for a plurality of paths in a path group, the path group comprising both IP and MPLS paths, each of the IP paths represented by an IP address and each of the MPLS paths represented by a label; code that assigns a unique path ID for each path within the path group, the path ID for each path comprising an IP address;

code that compares all path IDs in each path group;

code that assigns a common hardware resource to groups having matching path IDs; and a computer-readable storage medium for storing the codes and the path IDs;

wherein the path ID assigned for each of said IP paths comprises a unicast IP address and the path ID assigned for each of said MPLS paths comprises a unique IP multicast address.

* * * * *